(12) United States Patent
Edwards

(10) Patent No.: US 11,072,264 B2
(45) Date of Patent: Jul. 27, 2021

(54) PROTECTIVE ASSEMBLY

(71) Applicant: Lear Corporation, Southfield, MI (US)

(72) Inventor: Chris J. Edwards, Staffordshire (GB)

(*) Notice: Subject to any disclaimer, the term of this patent is extended or adjusted under 35 U.S.C. 154(b) by 0 days.

(21) Appl. No.: 16/506,059

(22) Filed: Jul. 9, 2019

(65) Prior Publication Data
US 2021/0009016 A1    Jan. 14, 2021

(51) Int. Cl.
*B60N 2/36*    (2006.01)
*B60N 2/30*    (2006.01)

(52) U.S. Cl.
CPC ............ *B60N 2/36* (2013.01); *B60N 2/3009* (2013.01)

(58) Field of Classification Search
CPC .......... B60N 2/36; B60N 2/366; B60N 2/363; B60N 3/004; B60N 3/102; B60R 5/045; B60R 5/044; B60R 5/048
See application file for complete search history.

(56) References Cited

U.S. PATENT DOCUMENTS

| | | | |
|---|---|---|---|
| 4,789,574 A | 12/1988 | Selvey | |
| 5,322,335 A | 6/1994 | Niemi | |
| 6,059,358 A * | 5/2000 | Demick | B60N 2/206 297/125 |
| 6,206,443 B1 * | 3/2001 | Konop | B60R 13/01 229/164 |
| 6,253,943 B1 * | 7/2001 | Spykerman | B60R 7/02 220/6 |
| 6,698,829 B1 * | 3/2004 | Freijy | B60N 2/3011 296/65.01 |
| 6,702,375 B1 * | 3/2004 | Laskowski | B60N 2/206 273/236 |
| 6,874,667 B2 * | 4/2005 | Dykstra | B60R 5/04 224/275 |
| 7,201,421 B2 * | 4/2007 | Reynolds | B60R 7/02 224/400 |

(Continued)

FOREIGN PATENT DOCUMENTS

| | | | |
|---|---|---|---|
| DE | 10030559 A1 | 1/2002 | |
| DE | 102013007421 A1 * | 10/2014 | ............... B60R 5/04 |

(Continued)

OTHER PUBLICATIONS

Webpage for Volvo Dirt cover, Load Compartment, Fully Covering; accessed Mar. 27, 2018 https://www.volvopartswebstore.com/products/volvo/xc90/protection/1173851/8682378.html.

*Primary Examiner* — Timothy J Brindley
(74) *Attorney, Agent, or Firm* — Fishman Stewart PLLC

(57) ABSTRACT

A protective assembly for a vehicle seat includes a support member, a hinge portion, and a base. The base may be connected to the support member via the hinge portion. The support member may be configured to rotate about the hinge portion between a first position and a second position. The support member may be substantially parallel to the base when the support member is in the first position. The support member may be disposed at an oblique or right angle relative to the base when the support member is in the second position. The support member may be configured to rotate about the hinge portion. The hinge portion may be connected to a biasing member. The biasing member may be configured to bias the support member toward the second position. The base may be fixed to a seat back of said vehicle seat.

20 Claims, 5 Drawing Sheets

(56) References Cited

U.S. PATENT DOCUMENTS

| | | | | |
|---|---|---|---|---|
| 7,300,105 B2 * | 11/2007 | Jasinski, II | ............ | B60N 2/206 297/119 |
| 7,523,985 B2 * | 4/2009 | Bhatia | .................... | B60N 2/206 297/188.04 |
| 7,562,931 B2 * | 7/2009 | Stojanovic | ........... | B60N 2/3013 296/24.4 |
| D644,979 S | 9/2011 | Wenrick et al. | | |
| D807,275 S | 1/2018 | Bennett | | |
| 10,428,564 B1 * | 10/2019 | Ewel | ........................ | B60R 7/043 |
| 2001/0039903 A1 * | 11/2001 | Patterson | ............... | B60N 3/004 108/44 |
| 2005/0087530 A1 | 4/2005 | Svenson | | |
| 2006/0170237 A1 | 8/2006 | McAuliffe | | |
| 2008/0257228 A1 * | 10/2008 | Chisler | ................. | B60N 3/005 108/44 |
| 2008/0303303 A1 | 12/2008 | Valentine | | |
| 2014/0101860 A1 * | 4/2014 | Iskowitz | ................ | B60N 3/001 5/655 |
| 2016/0121772 A1 * | 5/2016 | Stecko | .................... | B60R 7/043 108/25 |
| 2017/0291710 A1 * | 10/2017 | Barr-Perea | ......... | B64D 11/0636 |
| 2018/0008054 A1 * | 1/2018 | Vargas Garcia | ....... | B60N 3/004 |
| 2018/0065513 A1 * | 3/2018 | Line | ....... | B60N 3/004 |
| 2018/0111533 A1 * | 4/2018 | Johnson, Jr. | ........... | B60N 3/004 |
| 2019/0053635 A1 * | 2/2019 | Cheung | ................. | B60N 3/004 |
| 2019/0217784 A1 * | 7/2019 | Vanderpool | ............. | B60R 7/043 |
| 2019/0232875 A1 * | 8/2019 | Flores Marin | ............ | B60R 7/02 |
| 2019/0308533 A1 * | 10/2019 | Ewel | ..................... | B60N 3/101 |
| 2019/0308538 A1 * | 10/2019 | Buchanan | ................. | A47B 1/10 |
| 2020/0047645 A1 * | 2/2020 | Hamdoon | ................. | B60N 2/206 |

FOREIGN PATENT DOCUMENTS

| | | | | |
|---|---|---|---|---|
| DE | 102014204616 A1 * | 9/2015 | ........... | B60N 2/3031 |
| EP | 2397361 A1 * | 12/2011 | ............... | B60N 2/36 |
| FR | 3006638 B1 * | 10/2016 | ............. | B60N 2/206 |

* cited by examiner

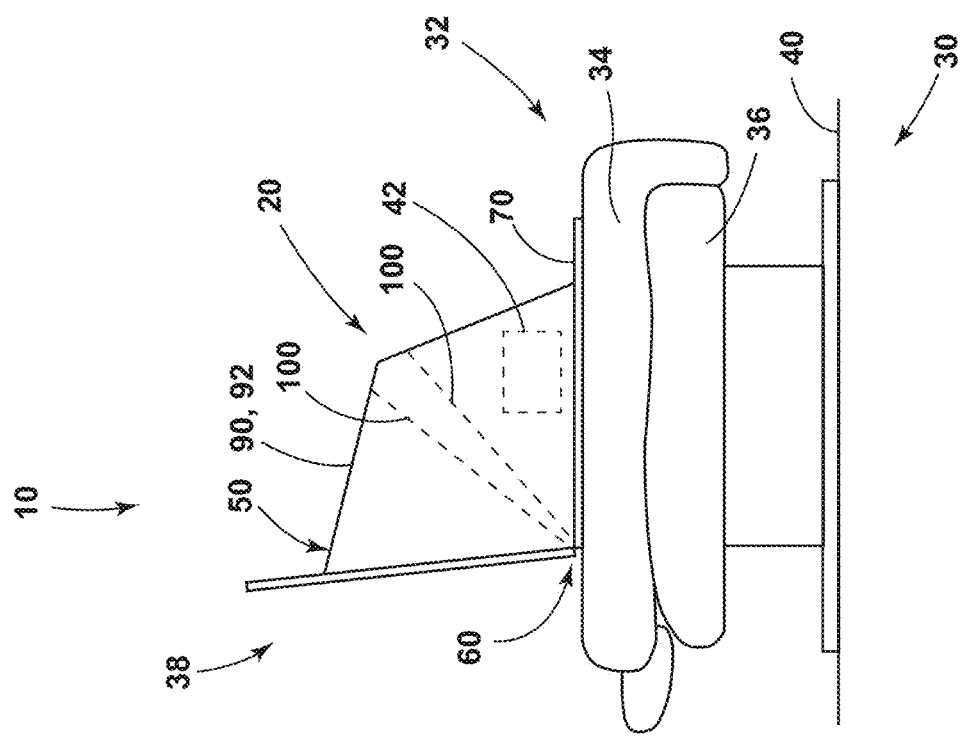
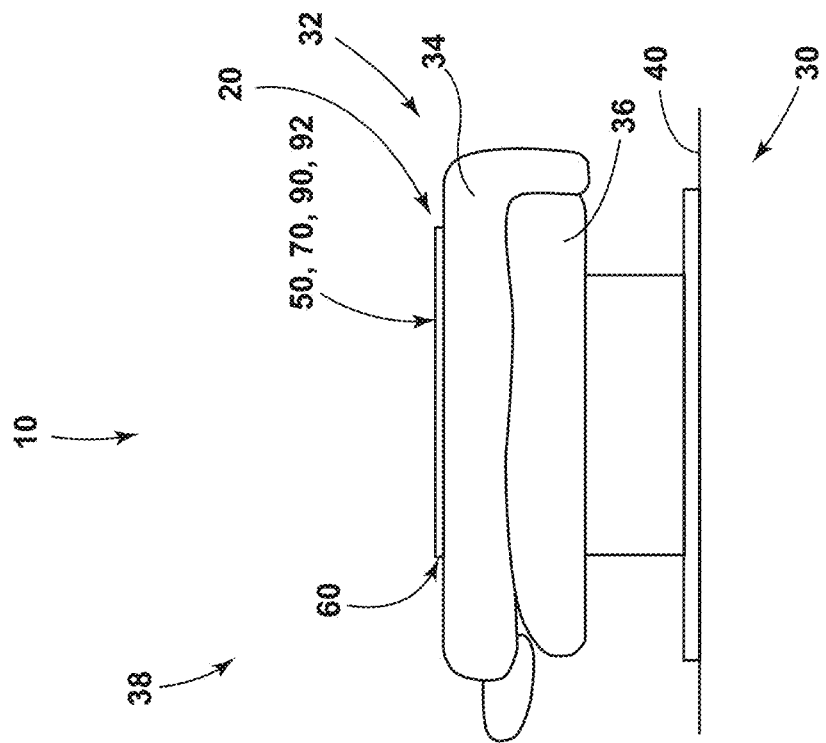

PROTECTIVE ASSEMBLY

TECHNICAL FIELD

The present disclosure generally relates to seat assemblies with protective assemblies that may be used in connection with a vehicle, such as an automobile.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some protective assemblies may be relatively complex to use and/or to assemble. For example, protective assemblies may involve a complex assembly or manufacturing process and may include many different steps and components. Some protective assemblies may not be configured to extend from a seat back of a vehicle seat.

There is a desire for solutions/options that minimize or eliminate one or more challenges or shortcomings of seat assemblies. The foregoing discussion is intended only to illustrate examples of the present field and is not a disavowal of scope.

SUMMARY

In embodiments, a protective assembly for a vehicle seat may include a support member, a hinge portion, and/or a base. The base may be connected to the support member via the hinge portion. The support member may be configured to move (e.g., rotate about the hinge portion) between a first position and a second position. The support member may be substantially parallel to the base when the support member is in the first position. The support member may be disposed at an oblique or right angle relative to the base when the support member is in the second position. The support member may be configured to rotate about the hinge portion. The hinge portion may be connected to a biasing member. The biasing member may be configured to bias the support member toward the second position. The base may be fixed to a seat back of said vehicle seat.

With embodiments, the protective assembly may include a first side member and/or a second side member. The first side member and/or the second side member may be configured to fold inwards toward a middle of the base when the support member moves from the second position to the first position. The first side member and/or the second side member may be configured to be substantially parallel to the support member and/or the base when the support member is in the first position. The first side member and/or the second side member may be configured to be substantially perpendicular to both of the support member and the base when the support member is in the second position. The support member may be substantially planar. The base may be substantially planar. The protective assembly may include a fastener. The fastener may be configured to substantially prevent movement of the support member when the support member is in the first position. The fastener may include a zipper, and/or the zipper may extend about a periphery of the base. The support member may include a carpet portion that may be disposed on an outer side.

In embodiments, the protective assembly may include a first side member and/or a second side member. The first side member and/or the second side member may include a rip-stop nylon material. A method of assembling a protective assembly may include providing a seat that may have a seat back. The method may include providing a support member, a side member, and/or a base. The base may have a first portion, a second portion, and/or a third portion. The method may include forming the support member with the first portion of the base. The method may include connecting the first portion and/or the third portion of the base to a frame of the seat back. The method may include connecting the second portion of the base to the third portion of the base. The support member may be configured to rotate relative to the base and/or the seat back between a first position and a second position. Connecting the third portion of the base to the frame of the seat back may include connecting the third portion to the frame with adhesive. Forming the support member may include cutting the first portion. The first portion and/or the second portion of the base may be indirectly connected to the frame of the seat back via the third portion of the base.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 1A is a side view of portions of an embodiment of a seat assembly having a protective assembly with a support member in a first position according to teachings of the present disclosure.

FIG. 1B is a side view of portions of an embodiment of a seat assembly having a protective assembly with a support member in a second position according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 2:
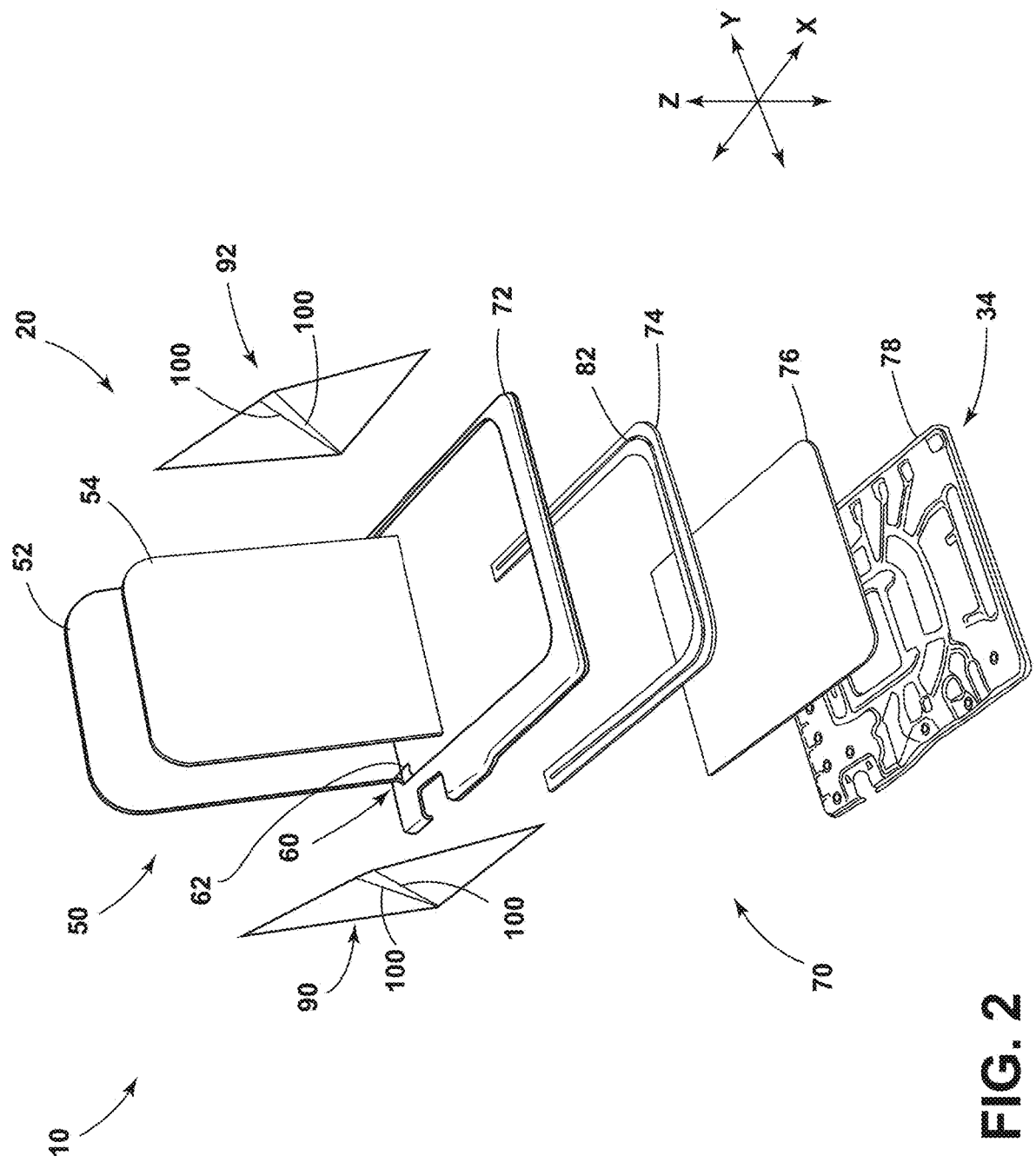
FIG. 2 is an exploded perspective view of portions of an embodiment of a seat assembly having a protective assembly according to teachings of the present disclosure.

In embodiments, such as generally illustrated in FIGS. 1A, 1B, and 2, a seat assembly 10 may include a protective assembly 20 and a seat 32. The protective assembly 20 may include a support member 50, a hinge portion 60, and/or a base 70. The protective assembly 20 may be configured to be connected to a seat 32 and/or may be integrated with a seat 32. The seat 32 may include a seat back 34 and/or a seat base 36. The protective assembly 20 may be connected to the seat back 34 and/or integrated with the seat back 34. The seat 32 may be a vehicle seat that may be disposed in a vehicle cabin 38 and/or may be connected to a mounting surface 40 (e.g., a vehicle floor) of a vehicle 30. The protective assembly 20 may be configured to protect an interior of a vehicle 30 (e.g., the inner surfaces of the vehicle doors/walls, headrests, and/or other seats). The protective assembly 20 may be configured to limit movement of cargo 42 that may be stored in a vehicle 30 (see, e.g., FIGS. 1B and 4), such as on or behind a seat assembly 10, which may be proximate the rear of the vehicle 30 and/or proximate a trunk of the vehicle 30. The protective assembly 20 may, for example and without limitation, be configured for use when the seat back 34 is substantially horizontal and/or substantially parallel to the seat base 36. Additionally or alternatively, the protective assembly 20 may be configured for use when the seat back is substantially vertical and/or not substantially parallel to the seat base 36.

Figure 3A:
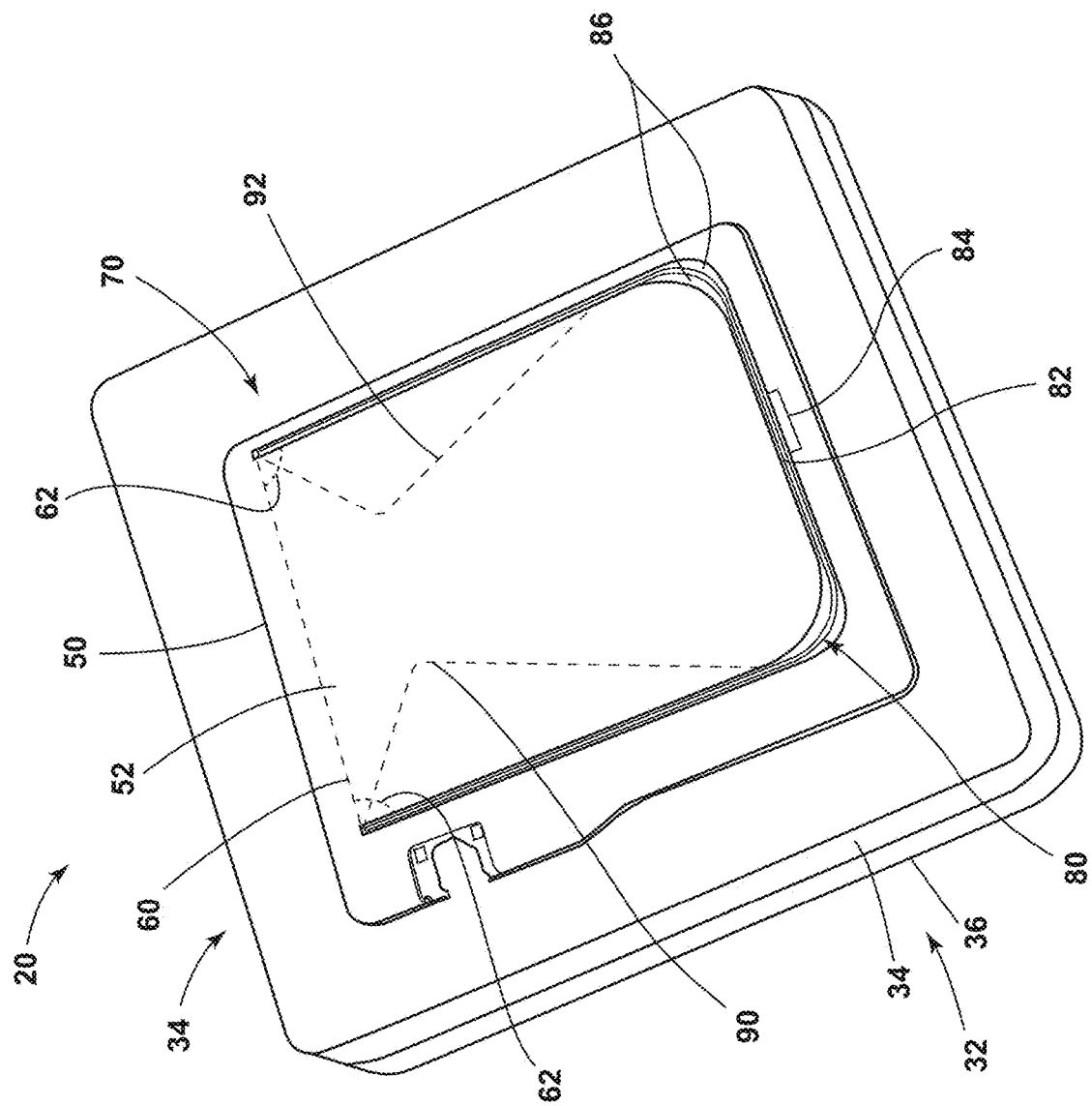
FIG. 3A is a perspective view of portions of an embodiment of a seat assembly having a protective assembly with a support member in a first position according to teachings of the present disclosure.
Figure 3B:
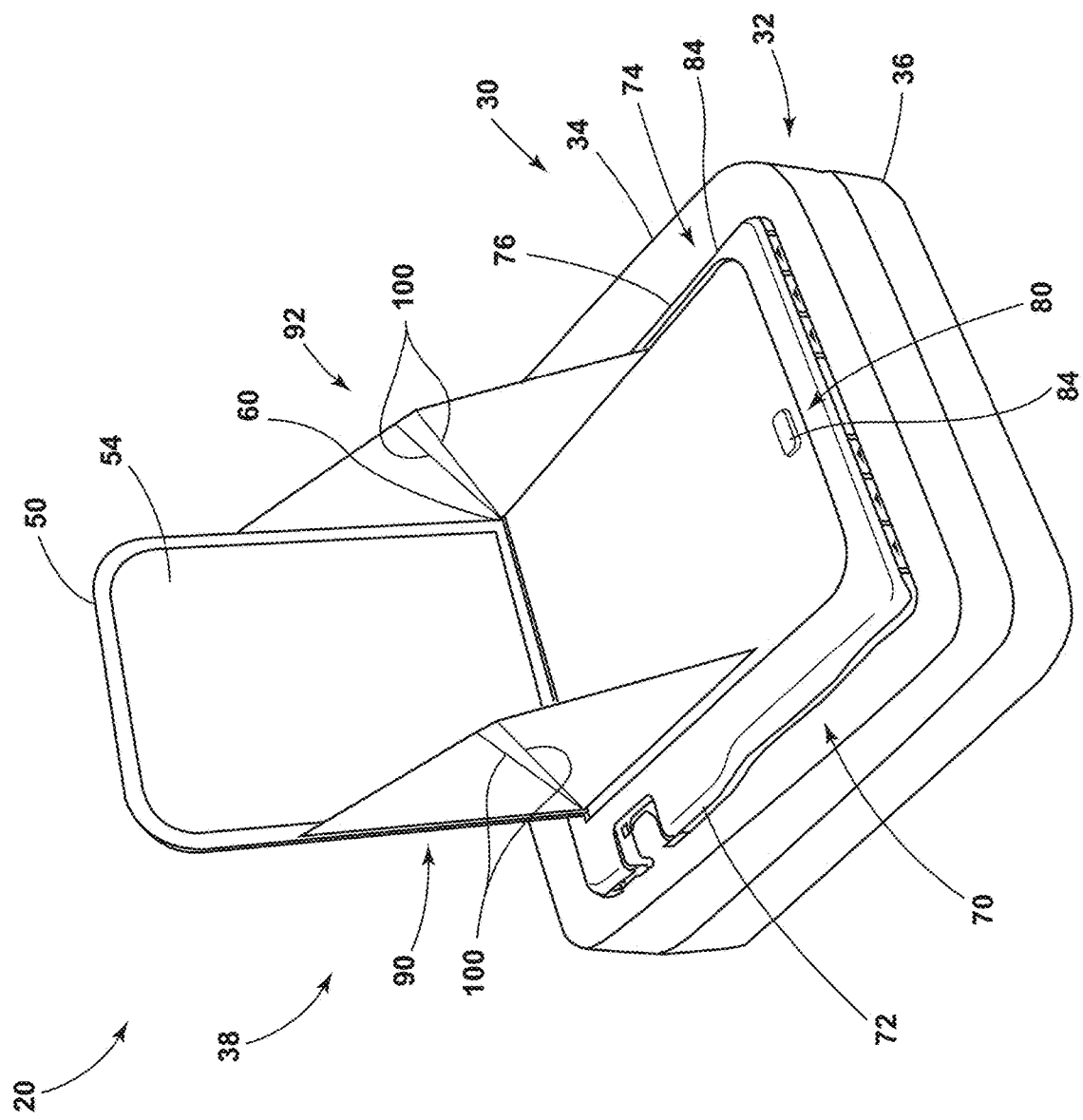
FIG. 3B is a perspective view of portions of an embodiment of a seat assembly having a protective assembly with a support member in a second position according to teachings of the present disclosure.

With embodiments, such as generally illustrated in FIGS. 2, 3A, and 3B, a support member 50 may be connected to a base 70. The support member 50 may be configured to move between a first position and a second position. The support member 50 may be configured to rotate about the hinge portion 60 between the first position and the second position. When the support member 50 is in the first position, the support member 50 may be substantially parallel to the seat back 34, the seat base 36, and/or the base 70. The protective assembly 20 may not be in use when the support member 50 is in the first position (e.g., may be a stowed position). When the support member 50 is in the second position, the support member 50 may be substantially perpendicular to the seat base 36, the seat back 34, and/or the base 70. The protective assembly 20 may be configured for use when the support member 50 is in the second position (e.g., the second position may be a use or extended position).

In embodiments, such as generally illustrated in FIGS. 2, 3A, and 3B, the support member 50 may include one or more of a variety of shapes, sizes, and/or configurations. For example and without limitation, the support member 50 may be substantially planar and/or rectangular. The support member 50 may include a carpet portion 52. The support member 50 may be connected/fixed (e.g., directly) to the seat back 34. For example and without limitation, the carpet portion 52 of the support member 50 may be may be connected to carpet of the seat back 34. The support member 50 may include a panel 54 that may be connected (e.g., fixed, such as via adhesive) to an inner surface of the carpet portion 52. The panel 54 may include one or more of a variety of materials, shapes, sizes, and/or configurations. For example and without limitation, the panel 54 may include compressed fiberboard and/or the panel 54 may be a plastic sheet. The panel 54 may be substantially planar and/or rectangular. The panel 54 may include a similar shape as the carpet portion 52. The panel 54 may be rigid and/or may provide structural support to the support member 50.

With embodiments, a protective assembly 20 may include a hinge portion 60. The hinge portion 60 may rotatably connect the support member 50 to the base 70. The hinge portion 60 may extend in the Y-direction and/or may be disposed at or along an edge of the support member 50. A protective assembly 20 may include one or more biasing elements 62. A biasing element 62 may, for example, include a spring. The biasing element(s) 62 may bias the support member 50 toward the second position. Additionally or alternatively, one or more side members 90, 92 that may be connected to the support member 50 and/or the base 70 may be configured to bias the support member 50 toward the second position. The hinge portion 60 may facilitate rotation of the support member 50, such as, for example and without limitation, about 90 degrees or more or less (e.g., to a second position at a right angle or an oblique angle relative to the base 70).

In embodiments, such as generally illustrated in FIGS. 2, 3A, and 3B, the base 70 may include a first portion 72, a second portion 74, and/or a third portion 76. The base 70 may be fixed (e.g., rigidly fixed) to the seat back 34. The first portion 72, the second portion 74, and the third portion 76 may be connected to each other. The first portion 72 may be connected to a frame portion 78 (e.g., a support portion) of the seat back 34. For example and without limitation, the first portion 72 may be connected (e.g., directly) to the frame portion 78 of the seat back 34 via an adhesive. The first portion 72 may not move substantially relative to the seat back 34. The first portion 72 may include one or more of a variety of materials, shapes, sizes, and/or configurations. For example and without limitation, the first portion 72 may be substantially rectangular and/or may extend along a periphery of the support member 50 when the support member 50 is in the first position. The first portion 72 may be molded carpet, and/or the carpet portion 52 of the support member 50 may be formed from the first portion 72, such as via water jet cutting a generally U-shaped opening/slit in the first portion 72. The first portion 72 may include substantially the same material as may be disposed on a rear surface of the seat back 34 (e.g., carpet).

With embodiments, the base 70 may include a second portion 74. The second portion 74 of the base 70 may be configured to selectively limit movement of the support member 50. The second portion 74 of the base 70 may be substantially U-shaped and/or may extend about a periphery of the support member 50 when the support member 50 is in the first position. The second portion 74 of the base 70 may prevent (e.g., substantially limit) movement of the support member 50 via a fastener 80. The fastener 80 may include a zipper 82 and/or a latch 84. The zipper 82 may include a substantially similar shape as the second portion 74 of the base 70 (e.g., the zipper 82 may extend in a U-shape about the second portion 74). The second portion 74 may be connected to the first portion 72. For example and without limitation, the second portion 74 may be sewn to the first portion 72. The second portion 74 may include one or more materials. For example and without limitation, the second portion 74 may include a heavy-duty zipper 82 that may be sewn into a nylon patterned shape. The zipper 82 may include one or more relief portions 86 that may include a carpet substrate. The relief portions 86 may be disposed at corners of the second portion 74. The relief portions 86 may provide flexibility and/or relief from tension that may result from securing the support member 50 in the first position.

In embodiments, the base 70 may include a third portion 76. The third portion 76 may include one or more of a variety of shapes, sizes, and/or configurations. For example, the third portion 76 may be substantially rectangular and/or planar. The third portion 76 may be disposed on the frame portion 78 of the seat back 34. The third portion 76 may be connected/fixed (e.g., directly) to the frame portion 78. For example and without limitation, the third portion 76 may be fixed directly to the frame portion 78 via an adhesive. The third portion 76 may be configured not to move substantially relative to the seat back 34 as the support member 50 moves between the first position and the second position. When the support member 50 is in the first position, the support member 50 may be substantially parallel to the third portion 76. The third portion 76 may not be exposed/visible when the support member 50 is in the first position (e.g., may be partially or entirely covered by the support member 50). When the support member 50 is in the second position, the support member 50 may be substantially perpendicular to the third portion 76. The third portion 76 may be exposed when the support member 50 is in the second position (e.g., may not entirely covered by the support member 50). The third portion 76 may include one or more of a variety of materials. For example and without limitation, the third portion 76 may include a fabric material (e.g., low grade carpet). The third portion 76 may be configured to protect cargo 42 from being damaged by the frame portion 78 when the support member 50 is in the second position.

With embodiments, such as generally illustrated in FIGS. 2, 3A, 3B, and 4, the protective assembly 20 may include a first side member 90 and/or a second side member 92. The first side member 90 and/or the second side member 92 may be connected to the support member 50 and/or the base 70. For example and without limitation, the side members 90, 92 may be sewn directly to the third portion 76 of the base 70 and/or may be sewn directly to the carpet portion 52 of the support member 50. The first side member 90 and/or the second side member 92 may connect the support member 50 to the first portion 72 and/or the third portion 76 of the base 70. The first side member 90 and/or the second side member 92 may include one or more shapes, sizes, and/or configurations. For example and without limitation, the side members 90, 92 may be rectangular, triangular, and/or planar. The side members 90, 92 may be configured to fold and/or flex as the support member 50 moves between the first position and the second position. The side members 90, 92 may include one or more of a variety of materials. For example and without limitation, the side members 90, 92 may include a rip-stop nylon material (e.g., may be resistant to ripping and/or tearing). The side members 90, 92 may be patterned and/or sewn.

Figure 4:
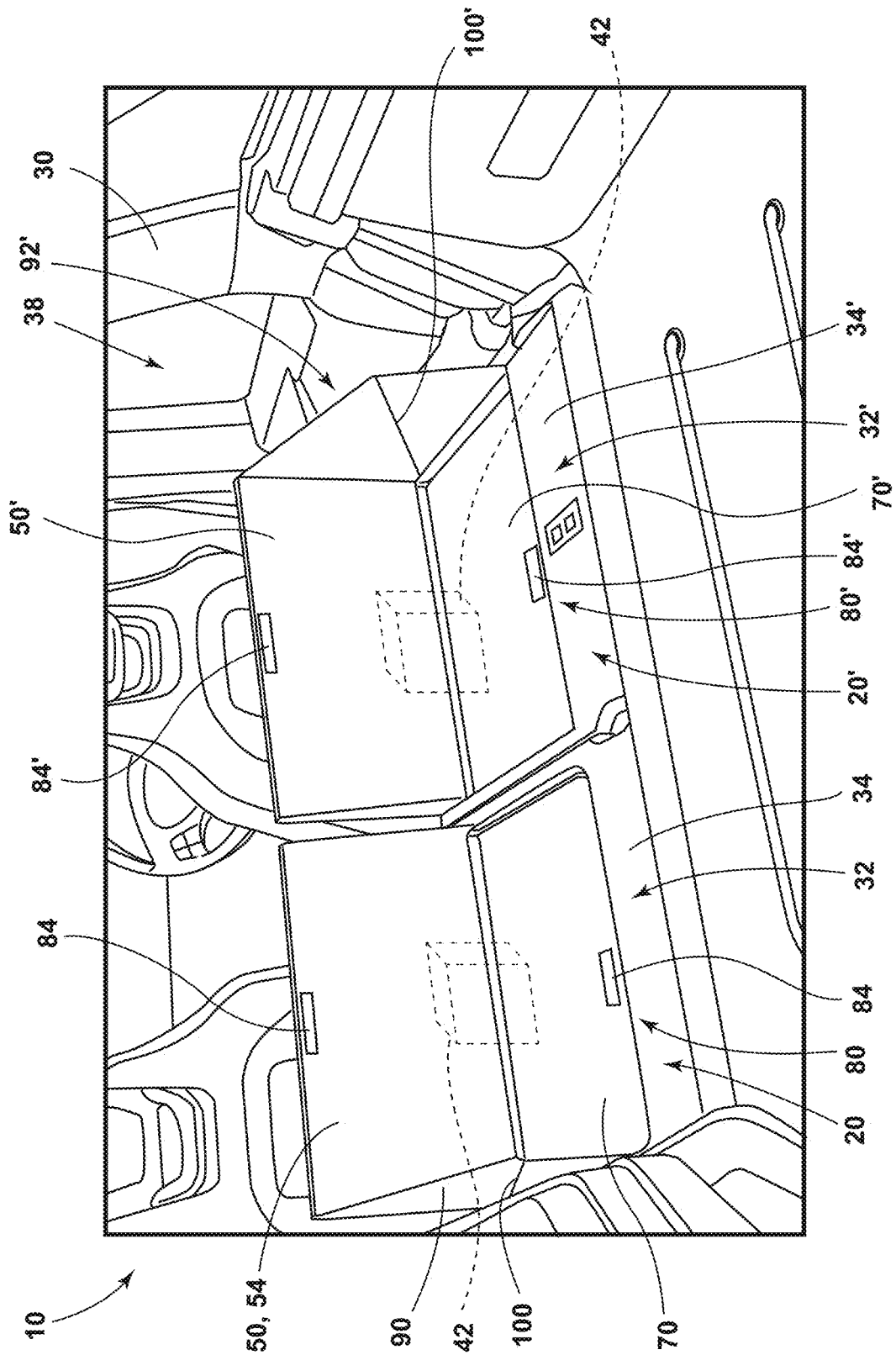
FIG. 4 is a perspective view of portions of embodiments of seat assemblies having protective assemblies with support members in second positions according to teachings of the present disclosure.

In embodiments, such as generally illustrated in FIGS. 2, 3B, and 4, the first side member 90 and/or the second side member 92 may include one or more ribs 100 (e.g., stiffening ribs) that may be configured to facilitate folding of the first side member 90 and/or the second side member 92. The side members 90, 92 may be configured to fold at or about the ribs 100. The side members 90, 92 may fold and unfold about the ribs 100 when the support member 50 moves between the first position and the second position. If the support member 50 is in the first position, the first side member 90 and/or the second side member 92 may be substantially parallel to the support member 50 and/or may be disposed partially or entirely between the support member 50 and the third portion 76 of the base 70. If the support member 50 is in the second position, the first side member 90 and/or the second side member 92 may be substantially perpendicular to the support member 50 and/or the base 70. The first side member 90 and/or the second side member 92 may be configured to bias the support member 50 toward the second position. For example and without limitation, the first side member 90 and/or the second side member 92 may provide a spring force that may bias the support member 50 toward the second position. The fastener 80 may be configured to provide a retaining force that is larger than the spring force of the side members 90, 92 such that when the fastener 80 is engaged, the fastener 80 may restrict and/or prevent movement of the support member 50 from the first position to the second position.

With embodiments, such as generally illustrated in FIGS. 1A, 1B, 3A, and 3B, the support member 50 may be configured to move between a first position and a second position. The seat back 34 may be substantially parallel to the seat base 36, and/or the seat back 34 may be substantially perpendicular to the base 70 when the support member 50 is in the first position. The protective assembly 20 may provide less protection and/or limit movement of cargo 42 to a lesser extent when the support member 50 is in the first position. The support member 50 may rotate (e.g., about 90 degrees) about the hinge portion 60 from the first position to the second position. The first side member 90 and/or the second side member 92 may move/unfold as the support member 50 moves to the second position (via the hinge portion 60, the biasing element 62, the first side member 90, and/or the second side member 92) when the fastener 80 is released and/or disconnected from the support member 50.

With embodiments, a protective assembly 20 may be configured to protect the interior of the vehicle 30 from cargo 42 that may be disposed in the vehicle 30 and/or may be configured to prevent damage to the cargo 42, such as by limiting movement of the cargo 42. For example, cargo 42 may be stored in the trunk and/or rear portion of the vehicle 30. The protective assembly 20 (e.g., the support member 50, the first side member 90, and/or the second side member 92) may limit and/or prevent direct contact between the cargo 42 and at least some portions of the interior (e.g., interior walls) of the vehicle 30. For example and without limitation, the support member 50 may be configured to limit forward movement of cargo 42 and/or the side members 90, 92 may be configured to limit lateral movement of cargo 42.

In embodiments, in the second position of the support member 50, the protective assembly 20 may be in a use position. The seat back 34 may rotate between a use/seating position and a folded/cargo position. The protective assembly 20 may rotate with the seat back 34. When the support member 50 is in the second position, the protective assembly 20 may be substantially perpendicular to the seat back 34. If the seat back 34 is in a folded position (e.g., an occupant is not sitting in the seat 32) and the support member 50 is in the second position, the support member 50 may be substantially perpendicular to the seat back 34 and the seat base 36. If the seat 32 is not in a folded position and the support member 50 is in the second position, the support member 50 may be substantially perpendicular to the seat back 34 and substantially parallel to the seat base 36. In such a configuration, the support member 50 may limit vertical movement of cargo 42 and/or may at least partially cover the cargo 42 to make the cargo 42 more difficult to see (e.g., as a theft avoidance measure). In the second position of the support member 50, the fastener 80 may not be connected to the support member 50, and/or the fastener 80 may not limit movement of the support member 50. The support member 50 may remain in the second position until an external force (e.g., a user/occupant) rotates the support member 50 to the first position and/or the fastener 80 engages the support member 50.

In embodiments, such as generally illustrated in FIG. 4, a seat assembly 10 may include a first seat 32 having a first protective assembly 20 and a second seat 32' having a second protective assembly 32'. The second protective assembly 20' may be configured in a similar manner as the first protective assembly 20. For example and without limitation, the second protective assembly 20' may be connected to a seat back 34' of the second seat 32', and/or may include a support member 50' that may be selectively latched to a base 70' via a latch 84'.

With embodiments, the first protective assembly 20 and the second protective assembly 20' may be complementary. For example and without limitation, the first protective assembly 20 may include a first side member 90 that may be disposed at or about a first side of the vehicle 30 (e.g., a left side) and the second protective assembly 20' may include a second side member 92' that may be disposed at or about a second side of the vehicle 30 (e.g., a right side). With such a configuration, the first protective assembly 20 may include a single side member 90 that may be configured to limit movement of cargo 42 in a first direction (e.g., to the left) and the second protective assembly 20' may include a single side member 92' that may be configured to limit movement of cargo 42 in a second direction (e.g., to the right).

With embodiments, a method of assembling a protective assembly 20 may include providing a support member 50, a side member 90, 92, and/or a base 70 having a first portion 72, a second portion 74, and/or a third portion 76. The method may include forming a carpet portion 52 of the support member 50 from the first portion 72 of the base 70, which may include the same material as and/or may be integrated with a seat back 34. The method may include connecting the first portion 72 and the third portion 76 of the base 70 to a frame 78 of the seat back 34, and/or connecting the second portion 74 of the base 70 to the first portion 72 of the base 70. The support member 50 may be configured to rotate between a first position and a second position. Connecting the third portion 76 of the base 70 to the frame 78 of the seat back 34 may include gluing the third portion 76 to the frame 78. Forming the support member 50 may include cutting the carpet portion 52 from the first portion 72 (e.g., in a U-shape). The second portion 74 of the base 70 may be indirectly connected to the frame 78 of the seat back 34 via the first portion 72 of the base 70. The protective assembly 20 and/or the frame 78 may be configured such that the rear side of the seat back 34 is substantially flat when the support member 50 is in the first position (e.g., the support member 50 may be substantially flush with a remainder of the rear of the seat back 34).

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A vehicle seat assembly, comprising:
   a seat including a rotating seat back having a seat frame; and
   a protective assembly connected to the seat back, the protective assembly including:
   a support member;
   a hinge portion; and
   a base fixed to the seat back and connected to the support member via the hinge portion;
   wherein the support member is configured to rotate about the hinge portion between a first position and a second position;
   the support member is substantially parallel to the base when the support member is in the first position; and
   the support member is disposed at an oblique or right angle relative to the base when the support member is in the second position;
   the protective assembly includes a first side member and a second side member;

the first side member and the second side member are fixed directly to and in contact with the support member and the base;
the base includes a first portion, a second portion, and a third portion;
the first portion and the third portion are connected to the seat frame such that the first portion and the third portion do not move relative to the seat frame;
the first side member is fixed directly to the third portion of the base and to a first edge of the support member; and
the second side member is fixed directly to the third portion of the base and to a second edge of the support member.

2. The vehicle seat assembly of claim 1, wherein the first side member has one or more ribs configured to facilitate folding of the first side member.

3. The vehicle seat assembly of claim 1, wherein the support member includes a carpet portion and a panel fixed to an inner surface of the carpet portion; and the carpet portion is connected to carpet of the seat back.

4. The vehicle seat assembly of claim 1, wherein the first side member and the second side member are configured to fold between the support member and the base when the support member moves from the second position to the first position; and
the first side member and the second side member are configured to unfold from between the support member and the base when the support member moves from the first position to the second position.

5. The vehicle seat assembly of claim 1, wherein the first side member is sewn with the support member and the base.

6. The vehicle seat assembly of claim 1, wherein the first side member and the second side member comprise a nylon material.

7. The vehicle seat assembly of claim 1, wherein the first side member and the second side member are configured to be substantially parallel to the support member and the base when the support member is in the first position; and
the first side member and the second side member are configured to be substantially perpendicular to both of the support member and the base when the support member is in the second position.

8. The vehicle seat assembly of claim 1, wherein the first portion of the base includes the same material as and is integrated with the seat back; and
a portion of the support member is formed from the first portion of the base.

9. The vehicle seat assembly of claim 1, including a fastener, wherein the fastener is configured to substantially prevent movement of the support member when the support member is in the first position.

10. The vehicle seat assembly of claim 9, wherein the fastener comprises a zipper; and the zipper extends in a U-shape about a periphery of the base.

11. The vehicle seat assembly of claim 1, wherein
the first portion and the third portion are fixed to the seat frame such that the first portion and the third portion do not move relative to the seat frame; and
in the first position, the support member is disposed such that the third portion is not visible.

12. The vehicle seat assembly of claim 1, wherein
the first portion and the third portion are fixed to the seat frame such that the first portion and the third portion do not move relative to the seat frame; and
the second portion is generally U-shaped and configured to selectively limit movement of the support member.

13. The vehicle seat assembly of claim 11, wherein the second portion of the base is indirectly connected to the seat frame via the first portion of the base.

14. A vehicle seat assembly, comprising:
a first seat including a rotating seat back having a seat frame;
a first protective assembly connected to the seat back, the first protective assembly including:
a support member;
a hinge portion; and
a base fixed to the seat back and connected to the support member via the hinge portion; and
a second seat having a second protective assembly;
wherein the support member is configured to rotate about the hinge portion between a first position and a second position;
the support member is substantially parallel to the base when the support member is in the first position;
the support member is disposed at an oblique or right angle relative to the base when the support member is in the second position;
the first protective assembly includes a first side member and the second protective assembly includes a second side member;
the first side member is disposed at a side of the first protective assembly; and
the second side member is disposed at an opposite side of the second protective assembly such that the first protective assembly and the second protective assembly are complementary and configured to limit movement of cargo in a first direction via the first side member and in a second direction via the second side member.

15. The vehicle seat assembly of claim 14, wherein the first side member is fixed directly to and in contact with the support member and the base of the first protective assembly.

16. The vehicle seat assembly of claim 15, wherein the base includes a first portion, a second portion, and a third portion;
the first portion and the third portion are connected to the seat frame such that the first portion and the third portion do not move relative to the seat frame; and
the first side member is fixed directly to the third portion of the base and to a first edge of the support member.

17. A method of assembling a protective assembly, including:
providing a seat having a seat back;
providing a support member, a side member, and a base, the base having a first portion, a second portion, and a third portion;
connecting the first portion and the third portion of the base to a frame of the seat back; and
connecting the second portion of the base to the third portion of the base;
wherein a portion of the support member is integrally formed with the first portion of the base;
the support member is configured to rotate relative to the base and the seat back between a first position and a second position; and
the side member is configured to fold between the support member and the base when the support member moves from the second position to the first position.

18. The method of claim 17, wherein connecting the third portion of the base to the frame of the seat back includes connecting the third portion to the frame with adhesive.

19. The method of claim 17, wherein providing the support member includes cutting a generally U-shaped slit or opening in the first portion of the base.

20. The method of claim 17, wherein the second portion of the base is indirectly connected to the frame of the seat back via the third portion of the base.

* * * * *